United States Patent [19]
Seifert

[11] 3,975,981
[45] Aug. 24, 1976

[54] SEPARATION SPRING ACTUATOR

[75] Inventor: Clair F. Seifert, Newport Beach, Calif.

[73] Assignee: The United States of America as represented by the Secretary of the Air Force, Washington, D.C.

[22] Filed: May 12, 1975

[21] Appl. No.: 576,505

[52] U.S. Cl. ............................ 89/1 B; 102/49.5
[51] Int. Cl.² .................................... F41F 5/00
[58] Field of Search ............... 102/49.4, 49.5, 2, 4; 89/1 B, 1.5 C, 1.5 D, 1.5 F

[56] References Cited
UNITED STATES PATENTS

| | | | |
|---|---|---|---|
| 3,431,854 | 3/1969 | Rabenhorst | 102/49.4 |
| 3,698,281 | 10/1972 | Brandt et al. | 102/49.5 |

Primary Examiner—David H. Brown
Attorney, Agent, or Firm—Joseph E. Rusz; Arsen Tashjian

[57] ABSTRACT

An actuator adapted for use in separating two interconnected bodies, while maintaining their respective desired directions. In the preferred embodiment, the actuator includes a housing which supports and guides a captive coiled spring that is adjusted for proper preload compression by a nut, and a center plunger to which is removably connected a bolt, headup. The actuator is attached to one of the interconnected bodies. The proper plunger travel is adjusted by a retraction tool that is then removed; and, the bolt is extended to touch the other interconnected body. When the interconnection is broken, the spring is released and, without changing the direction of the body to which the actuator is attached, imparts the desired direction to the first body.

3 Claims, 1 Drawing Figure

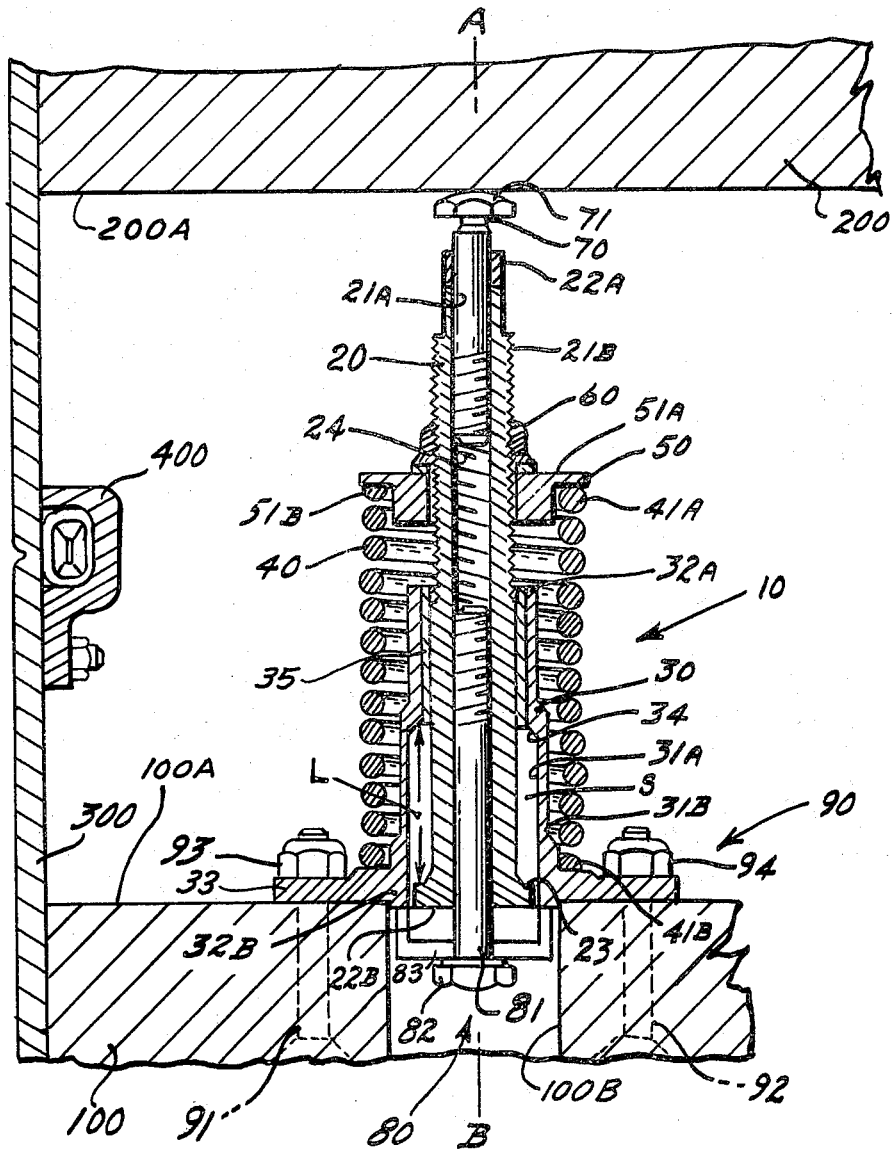

SEPARATION SPRING ACTUATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to a separation spring actuator and, more particularly, to a preferred embodiment thereof adapted for use in separating a plurality of interconnected bodies (i.e., two or more different bodies, or two or more portions of the same body), such as for example: blowing out emergency doors on an aircraft. Even more specifically, the preferred embodiment described and shown herein is structured to separate the interconnected bodies once the connection therebetween has been broken or the like by suitable means, such as the explosive severance means shown and described in U.S. Pat. No. 3,486,410.

Although prior art devices are satisfactory in those situations where the directions of the separated bodies are unimportant, these prior art devices are unsatisfactory where the pre-existing direction of the bodies are (or of one of the body is) not to be changed.

When two interconnected bodies have an aligned center of gravity, it is desirable that after severance the two bodies be pushed (or be moved, or the like) apart with a force vector which is along the longitudinal axis therebetween, so that although the two bodies are separated, the body of interest is not disturbed along its longitudinal axis or "tipped off" to change the direction in which the body is pointing.

My invention accomplishes the desired goal of actuating (or urging) the continued separation of the bodies, and of maintaining the body of interest in the desired pre-separation direction; thereby, I have advanced the state-of-the-art.

SUMMARY OF THE INVENTION

The principal object of this invention is to teach the structure of a unique separation actuator which, in its preferred embodiment, is especially well suited to move a disconnected or separated body, or a portion thereof, in a desired direction.

Another object of this invention is to provide an actuator as is described above which, in addition, has a minimum of components, is simple and reliable in operation, and is inexpensive to manufacture.

These objects, and other related and equally important objects, of my invention will become readily apparent after a consideration of the description herein of the invention, coupled with reference to the drawing.

DESCRIPTION OF THE DRAWING

The drawing is a side elevation view, partially in cross section, partially fragmented, partially in pictorial form and partially in simplified schematic form of a preferred embodiment of the invention in its working environment and while interposed between two interconnected bodies.

DESCRIPTION OF THE PREFERRED EMBODIMENT

With reference to the drawing, therein is shown a preferred embodiment 10 of my inventive separation spring actuator interposed between bodies 100 and 200 interconnected by common outer shell 300 (which functions as a retention member) to which an explose severance means 400, such as the one shown and described in U.S. Pat. No. 3,486,410, is attached.

Body 100 and body 200 have inner surfaces 100A and 200A, respectively, between which the preferred embodiment 10 of my inventive separation actuator is interposed, with each of the two respective "ends" of the preferred embodiment 10 abutting a different one of the two inner surfaces 100A and 200A. Body 100 also has a passageway 100B therein and therethrough.

It is to be noted, as a preliminary matter, that in the interest of simplicity and solely for illustrative reasons (and not because of any limitation) the center of gravity of body 100, and the center of gravity of body 200 are assumed to be aligned.

Now, with reference to the preferred embodiment 10, said embodiment has a geometric axis A–B and includes: a center plunger 20 which has an internal surface 21A, an external surface 21B, a first end 22A, a second end 22B, an external flange 23 at the second end 22B, and a suitably threaded passageway 24 through the center plunger 20; a hollow housing 30 that has an internal surface 31A, an external surface 31B, a first end 32A, a second end 32B, an external flange 33 at the second end 32B, and an abutment collar 34 on the internal surface 31A, with the hollow housing 30 disposed around and surrounding the second end 22B of the center plunger 20; a coiled cylindrical spring 40 which has a first end 41A and a second end 41B, with the spring 40 disposed over and surrounding the external surface 31B of the housing 30, and with the second end 41B abutting with the external housing flange 33; a cage portion 50 which has a first end 51A and a second end 51B, and is disposed over and surrounds a portion of the external surface 21B of the center flange 20, and is also disposed with the second end 51B abutting with the first end 41A of spring 40; a preload adjusting nut 60 threadably connected on and surrounding a portion of the center plunger 20 intermediate the first and second ends 22A and 22B of the center plunger 20, with the preload adjusting nut 60 abutting with the first end 51A of the cage portion 50; a bolt 70, with a head 71, threadably connected to and at the first end 22A of the center plunger 22; means, generally designated by reference numeral 80, for drawing the first end 22A of the center plunger 20 toward the first end 32A of the housing 30; and, means, generally designated by reference numeral 90, for attaching the housing 30 to one of the plurality of interconnecting bodies, such as 100.

It is to be noted that, with the internal abutment collar 34 of the housing 30 essentially oppositely disposed with respect to the center plunger flange 23 (as is intended, and as is shown in the drawing), an annular space generally designated "S" is formed and defined by: the abutment collar 34 of the housing 30; the internal surface 31A of the housing 30; the center plunger flange 23; and, the external surface 21B of the center plunger 20. The distance designated by opposite arrows and by the reference letter L denotes the length (i.e., amount) of throw or travel of center plunger 20.

It is also to be noted that spring 40 is captured between cage portion 50 and housing 30, and that the continual captive condition of the spring 40 is maintained by the threadably connected preload adjusting nut 60 in combination with the cage portion 50 and the housing 30.

It is further to be noted that as a matter of preference, rather than of necessity, a sleeve 35 is interposed between, and is made to abut with, the external surface 21B of plunger 20 and the internal surface 31A of hollow housing 30, between first end 32A and collar 34 of housing 30.

The means 80 for drawing the first end 22A of the center plunger 20 toward the first end 32A of the housing 30 may (but need not) comprise a "retraction" tool in the shape of a removable bolt 81 having preferably an oval hex head 82 and, optionally, a spacer 83 which, if used, is disposed in passageway 100B of body 100, with bolt head 82 abutting with, and pushing against, spacer 83.

The means 90 for attaching housing 30 to one of the plurality of bodies, such as 100, may (but need not) comprise a plurality of bolts, such as 91 and 92, and associated nuts, such as 93 and 94.

MANNER OF OPERATION OF THE PREFERRED EMBODIMENT

The manner of operation of the preferred embodiment 10 of my inventive separation actuator can easily be ascertained by a person of ordinary skill in the art from the foregoing description, coupled with reference to the drawing.

For others, it is sufficient to say that the actuator 10 is installed by first determining the length of throw L that is desired. This length of throw L is adjusted by rotation of the "retraction" tool 81 which draws the first end 22A of the center plunger 20 toward the first end 32A of the housing 30, compressing the spring 40. Once this adjustment is completed, the preload adjusting nut 60 is adjusted, so that the desired initial spring tension is present in spring 40. The preload adjusting nut adjusts the position of the cage portion 50 with respect to center plunger 20. After the two previously mentioned adjustments have been made, the bolt 70 is threadably adjusted with respect to the center plunger 20 until the head 71 of the bolt 70 comes in contact with the inner surface 200A of body 200 which is to be separated. After this adjustment is accomplished the retraction tool 81 is removed and, if spacer 82 is used, it also is removed.

CONCLUSION

It is abundantly clear from all of the foregoing, and from the contents of the drawing, that the stated objects of this invention have been attained.

Additionally, it is to be noted that, although there have been described the fundamental and unique features of my invention as applied to a particular preferred embodiment, various other embodiments, adaptations, additions, substitutions, omissions, and the like will occur to and, can be made by, those of ordinary skill in the art, without departing from the spirit of my invention. For example, in particular situations, a plurality of my inventive separation spring actuators can be used simultaneously to effectuate the separation of interconnected bodies and achieve and/or maintained the desired post-separation respective direction(s) of the bodies.

What is claimed is:

1. A spring separation actuator, adapted for use in separating a plurality of interconnected bodies, comprising:
    a. a center plunger, generally cylindrical in form, having a suitably threaded passageway therethrough, with said center plunger having an external surface, a first end, a second end, and a flange external of said center plunger at said second end;
    b. a hollow housing having an internal surface, an external surface, a first end, a second end, an external flange at said second end, and an abutment collar located on said internal surface at a preselected position between said first and second ends of said housing, with said housing disposed surrounding said second end of said center plunger, and with said internal abutment collar essentially oppositely disposed with respect to said center plunger flange, thereby forming and defining an annular space by and with said abutment collar, said internal surface of said housing, said center plunger flange, and said external surface of said center plunger;
    c. a cylindrical spring, with a first end and a second end, disposed over and surrounding said external surface of said housing, with said second end abutting with said housing flange;
    d. a cage portion, with a first end and a second end, disposed over and surrounding a portion of said external surface of said center plunger, and with said second end of said cage portion abutting with said first end of said spring;
    e. an adjusting nut threadably connected on and surrounding a portion of said center plunger intermediate said first and second ends of said plunger, and with said adjusting nut abutting with said first end of said cage portion, thereby capturing said spring by said adjusting nut, said cage portion, and said housing, and also thereby capturing said spring between said cage portion and said housing;
    f. a bolt threadably connected to and at said first end of said center plunger;
    g. means for drawing said first end of said center plunger toward said first end of said housing, thereby compressing said spring;
    h. and, means for attaching said housing to one of said plurality of interconnected bodies.

2. A spring actuator, as set forth in claim 1, wherein said means for drawing said first end of said center plunger toward said housing includes a retraction tool in the form of a bolt having a head and a threaded shank portion, removably inserted shank-first into said center plunger passage at the second end of said center plunger, and threadably adjustable with respect to said center plunger.

3. A spring actuator, as set forth in claim 1, wherein said means for attaching said housing to one of said plurality of interconnected bodies includes a plurality of bolts and associated nuts.

* * * * *